United States Patent [19]

Pegg

[11] Patent Number: 4,685,351

[45] Date of Patent: Aug. 11, 1987

[54] CYCLE PEDAL SHOE

[76] Inventor: Ronlee H. Pegg, 3953 S. Valley View Dr., #205 Eagan, Minn. 55122

[21] Appl. No.: 743,864

[22] Filed: Jun. 11, 1985

Related U.S. Application Data

[63] Continuation of Ser. No. 562,996, Dec. 16, 1983, abandoned, which is a continuation of Ser. No. 338,858, Jan. 12, 1982, abandoned, which is a continuation of Ser. No. 135,265, Mar. 31, 1980, abandoned.

[51] Int. Cl.⁴ ............................................. G05G 1/14
[52] U.S. Cl. .................. 74/594.4; 74/594.6; 36/131
[58] Field of Search ............... 74/594.4, 594.6, 531; 36/131

[56] References Cited

U.S. PATENT DOCUMENTS

| 554,686 | 2/1896 | Harris et al. |
|---|---|---|
| 589,443 | 9/1897 | Rathburn . |
| 598,325 | 2/1898 | McIntyre . |
| 627,086 | 6/1890 | Anderson . |
| 637,900 | 11/1899 | Smith . |
| 1,070,971 | 8/1918 | Lowd ................................. 74/594.4 |
| 2,030,672 | 2/1936 | Winning ................................ 74/531 |
| 2,568,443 | 9/1951 | Gerner et al. ...................... 74/594.4 |
| 3,283,336 | 11/1966 | Critser ............................... 24/652 X |
| 3,788,163 | 1/1974 | Gause et al. . |
| 3,964,343 | 6/1976 | Lauterbach . |
| 4,089,236 | 5/1978 | Genzling . |
| 4,188,737 | 2/1980 | Haver ................................... 36/131 |
| 4,538,480 | 9/1985 | Trindle ............................... 74/594.5 |

FOREIGN PATENT DOCUMENTS

| 2405037 | 4/1979 | France ................................. 36/131 |
|---|---|---|
| 16829 | of 1908 | United Kingdom ................ 36/131 |
| 1103458 | 2/1968 | United Kingdom ............. 74/594.4 |
| 1396393 | 6/1975 | United Kingdom ............. 74/594.6 |

Primary Examiner—Gary L. Smith
Assistant Examiner—Rodney M. Lindsey
Attorney, Agent, or Firm—Kinney & Lange

[57] ABSTRACT

In combination a pedal device including a crank shaft for rotation by pedaling, a shaft pedal member extending from the outer end of the crank shaft with said member having a circular cross section, and a shoe means for engagement of a rider's foot. The shoe means includes an upper portion covering a portion of the foot and a lower portion having a sole. The sole of the shoe means has a cleat means for enclosing the pedal member to position the sole above the pedal member. In a preferred embodiment, the pedal member is tapered to a smaller cross section further from the crank shaft while the cleat means is reverse tapered to enclose and accept the tapered pedal member and position the sole on the pedal member.

5 Claims, 6 Drawing Figures

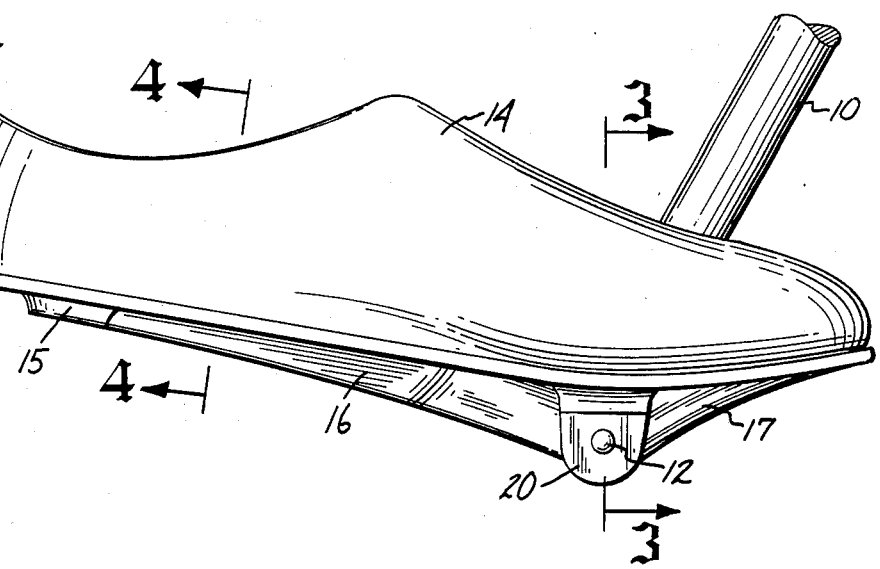
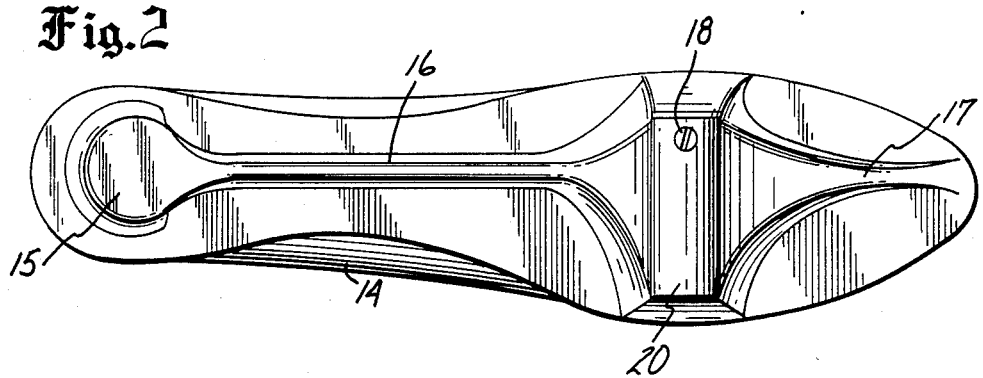
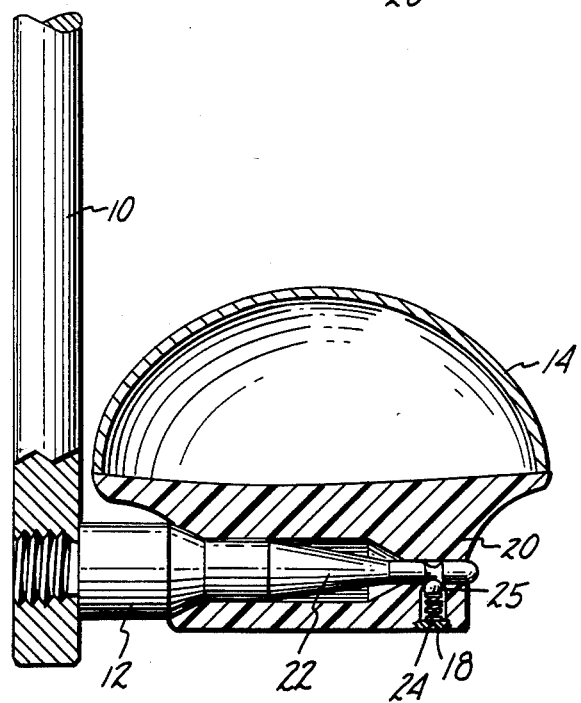

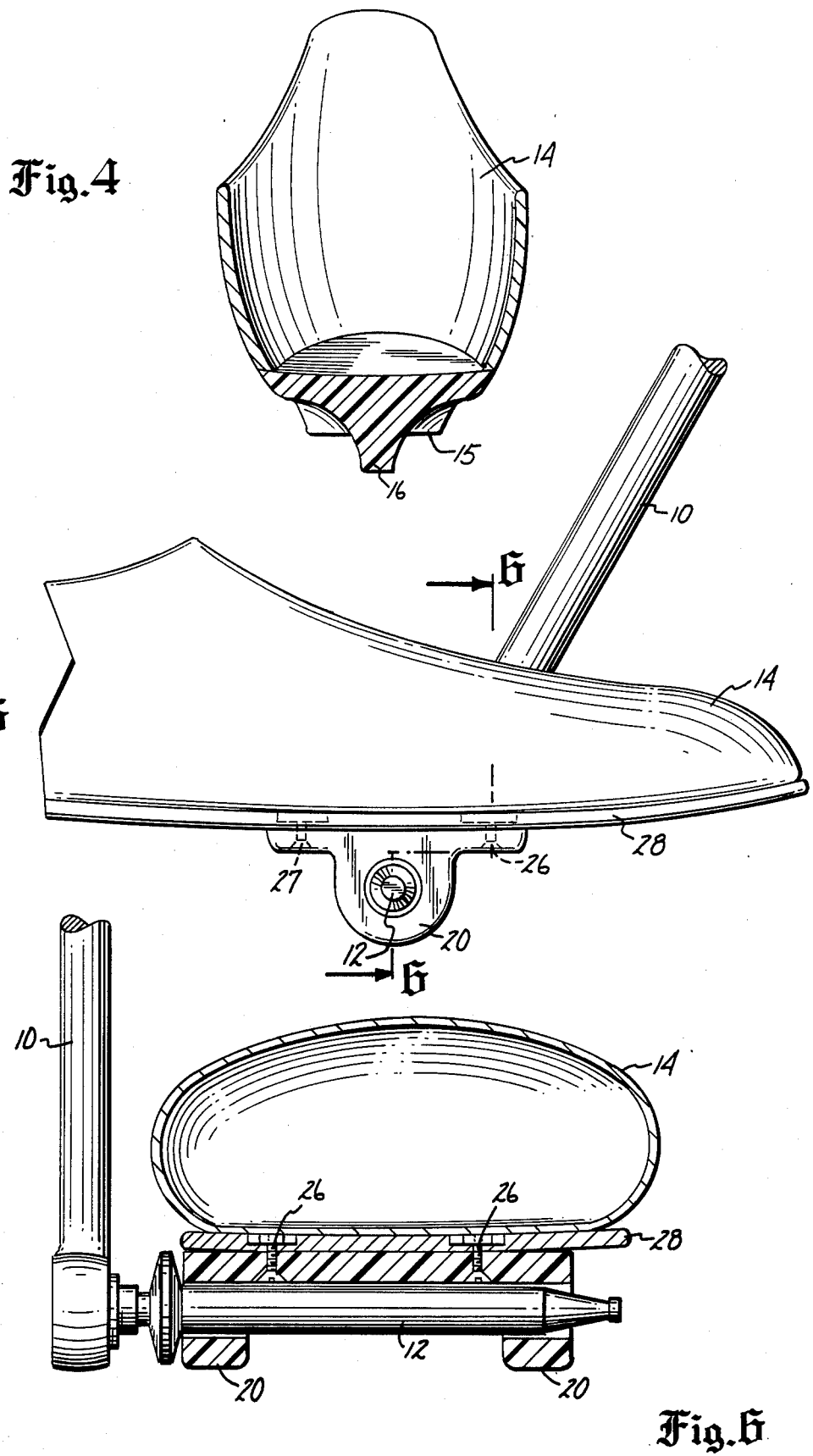

CYCLE PEDAL SHOE

This is a continuation of application Ser. No. 562,996, filed Dec. 16, 1983 (now abandoned), which was a continuation of application Ser. No. 338,858, filed Jan. 12, 1982 (now abandoned), which was a Continuation of application Ser. No. 135,265, filed Mar. 31, 1980 (now abandoned).

BACKGROUND OF THE INVENTION

1. Field of the Invention

Various devices have been proposed for use as pedal devices in combination with a crank shaft for pedaling devices such as bicycles ever since the first cyclist experienced difficulty in maintaining proper contact with the pedal.

2. Prior Art

U.S. Pat. No. 554,686 teaches the use of vacuum cups upon which the foot of the cyclist will rest. U.S. Pat. No. 589,443 discloses a transverse groove in the bottom of the sole of a shoe for more efficient engagement of the pedal by the cyclist. U.S. Pat. No. 598,325 has a slot on the pedal which fits into a slot on the shoe for improved engagement of the pedal. U.S. Pat. No. 627,086 provides a heel and toe adjustment to the pedal so as to adjust the pedal to the length of the cyclist's foot. U.S. Pat. No. 637,900 discloses an attachment to an ordinary walking shoe which is then attached to the pedal as well. All of these devices provide for some engagement of the foot and the pedal so as to improve the efficiency during the downward stroke of the pedal.

U.S. Pat. No. 3,788,163 discloses a latching mechanism with a series of plates in a stack to be rotatably engaging a grid. U.S. Pat. No. 4,089,236 discloses a shoe with a lock means and jaws with a sole plate and an upper ramp surface. U.S. Pat. No. 3,964,343 teaches a pedal gripping means which is adapted to be secured to the sole using a prismatic configuration with two polyonal end surfaces and at least three mutually congruent side faces. Other more complicated devices could be contrived if excess weight and expense were not a major factor in bicycle pedal design.

While it is desirable to provide a pedal gripping means for the cyclist to efficiently engage the pedal, other considerations have become important in the ultimate enjoyment of a pedaling device. Clearly, any additional weight added to the cycle in the pedals increases the work required for propulsion without increasing the efficiency of the device. Devices which inhibit the rapid removal of the cyclist's foot from the pedal are clearly unsafe. Devices which inhibit the rider's quick and troublefree insertion of his foot on the pedal oftentimes defeat the efficiencies of the device and are also unsafe. Rapid insertion and removal of the foot is needed so that the bike does not tip over when coming to a stop. Also being able to start quickly in traffic is important, and delay in engaging the pedal should be eliminated.

SUMMARY OF THE INVENTION

It has been discovered that an improved pedal device can be constructed which permits rapid engagement and disengagement of the rider's foot, is light in weight yet has more than adequate strength for rapid pedaling, and is capable of firmly fixing the foot to the pedal for optimum transmission of the cyclist's pedaling and power. Specifically, the device comprises, in combination, a crank shaft for rotation by pedaling, a shaft pedal member extending from the outer end of the crank shaft, said member having a circular cross section, and shoe means for engagement of a rider's foot. The shoe means includes an upper portion covering a portion of the foot and a lower portion having a sole. The shoe is comfortable, even during a power upstroke. The sole includes cleat means for enclosing the pedal member to position the sole above the pedal member and permit transfer of leg power on the upstroke and the downstroke. Preferably, the shaft pedal member is cylindrical in shape.

Alternatively, in a preferred embodiment, the shaft pedal member is tapered to a smaller cross section further from the crank shaft. It is preferred that the cleat means positions the pedal member at approximately the ball of the foot. When the pedal member is tapered to a smaller cross section, it is preferred that the cleat means be reverse tapered to enclose and accept the tapered pedal member whereby the mutual tapering acts to position the sole on the pedal member at the appropriate spot. The cleat means and the pedal means can further include a centering means for positioning the cleat means without substantially restraining disengagment from the pedal. Because of the circular cross section, the cleat means and the pedal means are never out of alignment with each other.

In another preferred embodiment, the sole may include beam means extending substantially the length of the sole and of sufficient thickness to limit the deflection of the sole. The beam means further can extend under the toe of the sole to limit deflection of the toe, thereby permitting maximum transfer of the cyclist's power by spreading the force transferred to the shaft pedal member across the entire foot or substantially entire foot of the rider. Flexibility can be increased to suit the individual by trimming the beam means.

BRIEF DESCRIPTION OF THE DRAWINGS

FIG. 1 is a side elevational view of the preferred embodiment of the present invention.

FIG. 2 is a bottom view of the device shown in FIG. 1.

FIG. 3 is a sectional view along lines 3—3 of FIG. 1.

FIG. 4 is a sectional view along lines 4—4 of FIG. 1.

FIG. 5 is a side elevational view of another embodiment of the present invention.

FIG. 6 is a sectional view of the device shown in FIG. 5 along lines 6—6.

DETAILED DESCRIPTION OF THE PREFERRED EMBODIMENTS

The pedal device of the present invention is shown generally in FIG. 1 attached to a crank shaft 10 which is to be rotated by pedaling. Typically, this crank shaft is the crank shaft of a bicycle, tricycle or other pedal device, although the principles of this invention may equally apply to devices such as exercise machines, human power generating devices for transforming pedal motion into electricity, pedal boats which employ a paddle of some form driven by gears off of a rotated crank shaft and the like. Attached to crank shaft 10 is shaft pedal member 12 extending from the outer end of crank shaft 10. Shaft pedal member 12 has a circular cross section as shown in FIG. 1 and as can be seen in FIGS. 3, 5 and 6.

A shoe means 14 is provided for engagement of a rider's foot and includes an upper portion 14 covering a portion of the foot and a lower portion having a sole 16 as shown in FIGS. 1 and 2. In a preferred embodiment as shown in FIG. 1, the entire shoe forms a portion of the present invention and includes heel portion 15 and toe portion 17. Sole 16 may be constructed in the form of a beam means which extends substantially the length of the shoe and is of sufficient thickness to limit deflection of the sole. Modification of the thickness can be made to suit individual requirements. FIG. 4, which is a section along lines 4—4 of FIG. 1, shows the beam construction of sole 16 and its relationship to upper portion 14 of the shoe. As can be seen in FIG. 1, the beam means may extend under the toe of the shoe so as to limit the deflection of toe 17.

The device further includes a cleat means 20 attached to sole means 16. Cleat means 20 is designed to enclose pedal member 12 so as to position sole 16 above pedal member 1.

In a simple form of the present invention, cleat means 20 can be attached to the sole of a shoe as shown in FIG. 5 where cleat 20 is firmly attached to sole 28 through screws 26 and 27. Sole 28 and upper portion 14 are of a conventional bicycling shoe which can be modified inexpensively to incorporate the features of the present invention. Actually, any shoe can be modified in this manner. As shown in FIG. 6, the shaft pedal member 12 has a circular cross section and is substantially cylindrical in shape. Cleat means 20 is adapted to enclose pedal member 12 merely by having the rider slide the shoe 14 over pedal member 12 in groove 20. It should be noted that pedal member 12 and cleat 20 engage one another without regard to the position of pedal member 12.

In a preferred embodiment, as shown in FIG. 3, pedal member 12 is tapered to a smaller cross section further from the crank shaft 10 as shown by portion 22. Cleat means 20 is reverse tapered to accept the tapered pedal member so as to center the sole on the pedal member. Cleat means 20 and pedal member 12 contain a spring 24 and a ball 25 for centering cleat member 20 without substantially restraining disengagement of the cleat member from the pedal means. Thus in this embodiment the rider can readily position the foot on the pedal by insertion of the pedal member 12 into cleat 20, with the further assistance of spring 24 and ball 25 for accurate centering. The spring is not of sufficient strength to significantly restrain disengagement of the foot from pedal means 12.

FIG. 2 shows the bottom of the device shown in FIG. 1 and includes the embodiment shown in FIG. 3. Adjustment screw 18 is provided to vary the tension of spring 24 in FIG. 3 to permit the centering of the foot on the pedal without substantial hindering of the disengagement at any time by the rider. This is particularly true when the bike is brought to a sudden stop, requiring the rider to disengage his foot to prevent falling.

As can be seen, a new and highly efficient shoe for use with a bicycle has been provided with is safe, economical, strong and comfortable. The shoe can be used with the pedal with essentially no effort, permitting quick engagement and disengagement without the rider having to take his eyes from the road. The shoe top is strong, to permit maximum power to be applied during an upstroke, yet it is comfortable since it can be sized to fit the foot. Straps and clamps are eliminated. In addition the shoe is lighter, eliminating the pedal and the addition of a shank to the sole of the shoe. Finally, flexibility can be adjusted to suit the individual by modifying the beam on the sole.

Although the present invention has been described with reference to preferred embodiments, workers skilled in the art will recognize that changes may be made in form and detail without departing from the spirit and scope of the invention.

What is claimed is:

1. A combination for connecting a foot of a rider to a foot-driven cycle or the like, the combination comprising:

a cycle crank shaft;

a pedal shaft forming a part of the cycle and having an inner end fixedly attached to an outer end portion of the crank shaft, the pedal shaft extending outwardly along a longitudinal axis generally perpendicular to the crank shaft to an outer end, and the pedal shaft having a shoulder adjacent the inner end, a first shaft portion of a circular cross section and a first diameter positioned between the shoulder and the outer end, and a second shaft portion of a circular cross section and a second diameter which is no greater than the first diameter positioned adjacent the outer end of the pedal shaft;

a shoe adapted to be worn on the rider's foot; and cleat means mounted below and fixedly attached to a sole of the shoe for providing a quick-connect/disconnect force transmitting connection between the shoe and the pedal shaft; wherein the cleat means defines a longitudinal extending opening of circular cross section for receiving the pedal shaft and permitting the pedal shaft to rotate freely within the opening with respect to the cleat means and the shoe about the longitudinal axis as the crank shaft is rotated when the pedal shaft and the cleat means are in the connected position; wherein the longitudinal extending opening has an entrance positioned below the inner side of the shoe; the cleat means comprising:

first pedal shaft engaging means fixedly attached to and positioned below the sole proximate the inner side of the shoe between the toe and the heel end for guiding the second shaft portion of the pedal shaft into the longitudinal opening as the shoe is moved in the first axial direction toward the crank shaft to move the cleat means toward the connected position and for rotatably engaging the first shaft portion of the pedal shaft when the pedal shaft and the cleat means are in the connected position to transmit force in the transverse direction from the foot through the shoe and the cleat means to the first shaft portion, the first pedal engaging means having a first portion of the longitudinal opening therein which has a circular cross section of a diameter approximately equal to the first diameter;

second pedal shaft engaging means fixedly attached to and positioned below the sole proximate the outer side of the shoe between the toe end and the heel end for rotatably engaging the second shaft portion of the pedal shaft when the pedal shaft and the cleat means are in the connected position to transmit force in the transverse direction from the foot through the shoe and the cleat means to the second shaft portion, the second pedal engaging means having a second portion of the longitudinal opening therein which is axially aligned with the first portion and has a circular cross section of a diameter approximately equal to the second diameter; and means adjacent the entrance of the longitudinal opening for engaging the shoulder of the pedal shaft when the shoe reaches an end of its movement in the first axial direction inwardly toward the crank shaft to define the connected position; and beam means projecting downwardly from a bottom surface of the sole and extending substantially the length of said sole and of sufficient thickness to limit deflection of the sole, the beam means including a first rigid beam section fixedly attached to the sole and the cleat means and extending from a heel end of the shoe to the cleat means.

2. The combination of claim 1 wherein said beam means includes a second rigid beam section fixedly attached to the sole and the cleat means and extending from the cleat means to the toe end of said sole to limit deflection of said sole.

3. The combination of claim 1 wherein the first rigid beam section includes a plate integral with the cleat means, the plate projecting downwardly from the sole and lying generally in a plane perpendicular to the sole.

4. The combination of claim 3 wherein the plate tapers from a wide portion adjacent the cleat to a narrow portion adjacent a heel end of the sole.

5. A method of making a releasably interengaging connection between a bicycle pedal and a shoe to be worn by a person pedalling the bicycle which permits force to be transmitted from the shoe to the pedal through 360° of pedalling rotation, the method comprising:

providing on the shoe a cleat which forms a female connector which defines a longitudinally extending opening of circular cross-section for engaging an elongated cylindrical male connector defined by the pedal, the female connector having an entrance positioned below an inner side of the shoe;

engaging the foot and pedal by moving the foot inward toward the bicycle in a direction substantially parallel to a longitudinal axis of the pedal and moving the female connector over the male connector to thereby capture the male connector within the female connector; and disengaging the foot and pedal without use of hands solely by moving the foot outward in a direction substantially parallel to the longitudinal axis of the pedal until the male and female connectors are no longer in engagement.

* * * * *